United States Patent
Le Crom et al.

(10) Patent No.: US 7,677,460 B2
(45) Date of Patent: Mar. 16, 2010

(54) SMARTCARD METHOD AND COMPUTER SYSTEM

(75) Inventors: Serge Gerard Le Crom, Grenoble (FR); Louisa Saunier, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1031 days.

(21) Appl. No.: 11/378,305

(22) Filed: Mar. 20, 2006

(65) Prior Publication Data

US 2007/0215710 A1    Sep. 20, 2007

(30) Foreign Application Priority Data

Mar. 18, 2005    (EP) .................................. 05300199

(51) Int. Cl.
*G06K 19/06* (2006.01)

(52) U.S. Cl. ............................. 235/492; 235/380; 726/9

(58) Field of Classification Search ................. 235/492, 235/380; 726/9

See application file for complete search history.

(56) References Cited

U.S. PATENT DOCUMENTS 6,539,539 B1    3/2003    Larsen et al.

FOREIGN PATENT DOCUMENTS

WO    01/78020 A    10/2001

OTHER PUBLICATIONS

Mike Hendry; "Smart card security and applications" 1997, Artech House Publishing, MA, USA, XP00236022; p. 218, paragraph 2 to p. 219, paragraph 1.

*Primary Examiner*—Michael G Lee
*Assistant Examiner*—Kristy A Haupt

(57) ABSTRACT

A method and computer system for determining the compatibility, for application to a smartcard, of smartcard personalization profiles, the respective smartcard personalization profiles describing respective file trees on the smartcard that are required by respective applications. The method involves determining if the sets of paths of the file trees described by the respective smartcard personalization profiles are disjoint.

18 Claims, 3 Drawing Sheets

SMARTCARD METHOD AND COMPUTER SYSTEM

FIELD OF THE INVENTION

The present invention relates to the field of computer systems, and more particularly without limitation to the field of smartcards.

This application claims priority to copending Europe utility application entitled, "A Smartcard Method And Computer System" having serial no. EP 05300199.6, filed Mar., 18$^{th}$ 2005, which is entirely incorporated herein by reference.

BACKGROUND AND RELATED ART

A smartcard is a typically credit-card sized plastic case with an embedded microprocessor chip that offers a variety of services, varying from simple secure data storage to sophisticated cryptographic services. Smartcards are becoming increasingly used for purposes of authentication and authorization of the person carrying the card, storing information of a personalized nature, and storing values.

The smartcard life cycle always starts with a personalization. Personalization of a smartcard is the process of creating and initializing smartcard objects such as directories, files, passwords, and cryptographic keys on the smartcard for future use by one or more applications. Passwords by convention are often of numerical form, known as personal identification numbers. Files include data files of arbitrary format as well as files of standardized format such as password files, which hold one or several passwords, or cryptographic key files, which hold one or more cryptographic keys. Personalization is usually performed by the manufacturer or card-issuing authority before shipping the smartcard to the end-user. The personalization of a smartcard can be formally described by a personalization profile, which defines the required smartcard objects and attributes.

Using a single smartcard for multiple applications is desirable to the end-user, who can perform multiple functions without having to carry multiple smartcards. It is also economical because it helps to prevent waste of smartcards. Further benefits arise when multiple applications can share information on the smartcard, such as the same password, the same cryptographic key, or the user's bank account information.

However, despite the benefits use of a single smartcard for multiple applications is rare today, especially for applications supplied by multiple parties. Different applications that are not carefully coordinated may require mutually incompatible personalization profiles. Trying to apply a personalization profile for an application to a smartcard that has already been personalized for another application carries the risk of failure and loss of the smartcard if the personalization profiles are incompatible.

Prior efforts have been made to facilitate the use of multiple applications with a smartcard. Smartcard manufacturers today usually provide pre-personalized smartcards and a smartcard access layer, which hard-codes the smartcard structure expected by a pre-defined application interface. Multiple applications can access the same smartcard within the confines of a pre-defined interface and smartcard structure.

The Public Key Cryptography Standard #15 describes a standard for the format of cryptographic credentials stored on cryptographic tokens, of which smartcards are a special case. The standard specifies a limited set of smartcard objects and hard-codes the names of the objects, which need to be used by applications compatible with the standard.

For smartcards comprising a Java virtual machine, support for loading multiple Java applications on the card is available. However, the support applies to Java applications or applets running on the card and not to the smartcard objects such as directories, password files, or cryptographic keys.

SUMMARY

In accordance with the present invention there is provided a method for determining the compatibility of first and second personalization profiles of a smartcard for respective first and second applications requiring first and second file trees to be installed on the smartcard for execution of the first and second applications by a computer that is coupled to the smartcard. The first and second file trees have respective first and second sets of paths used by the first and second applications to locate smartcard files on the smartcard. The first and second personalization profiles are preferably provided as files, e.g. of Extensible Markup Language format, that can be downloaded to the computer system running the applications from a database or web server, or be installed as part of the application's installation package, or be stored on the smartcard itself given there is enough memory on the smartcard. The method comprises determining if the first and second sets of paths are disjoint, and returning a signal indicative of the compatibility if the first and second sets of paths are disjoint. Personalization profiles found to be compatible in this way can be applied to the same smartcard in any order.

The present invention enables personalizing the smartcard for the needs of different applications by applying personalization profiles either at the same time or incrementally at different times when the need appears, and determining in advance that the personalizing will not fail due to an error caused by an incompatibility of the requirements of the different applications. Preferably, the state of the smartcard is also examined, determining that the personalization will not fail because of insufficiently available memory on the smartcard.

The first and second applications access information on the smartcard in the form of smartcard objects defined by the respective first and second personalization profiles. The smartcard objects may include data files of an application-specific format stored on the smartcard, but also passwords or cryptographic keys, of which several can be contained in files of a standardized format. The first and second personalization profiles may further define respective mappings between logical names for the smartcard objects that are used by the respective first and second applications when accessing the objects, and smartcard-specific properties of the same objects that allow creating or accessing the objects on the smartcard. The mappings provided by the respective personalization profiles add a level of indirection allowing modifying the smartcard structure without modifying the application using it.

The present invention is particularly advantageous as it enables use of the same smartcard by different applications. For example, the invention enables an end-user or a developer or an administrator of smartcard applications to reuse existing smartcards for upgrading to new versions of an application, or for applying a personalization profile for a new application to a smartcard that is already personalized for other applications. A new personalization profile can be applied to a smartcard independently of the computer where the smartcard was previously personalized. For example, the present invention enables providing a single fidelity card to consumers that can be used for different shops, chains, hotels, or transportation at the choice of the consumer—the fidelity card would be a smartcard that is incrementally personalized at different shops.

The end-user can personalize the smartcard herself or himself for applications he or she decides to add to the card after the card has been issued. One example for an application would be using the smartcard as a portable, secure storage for certificates or objects containing digital-rights definitions. The end-user could dynamically download the certificates or digital-rights objects directly at the point of usage of the smartcard, for example a public terminal or a home computer. To store the objects just downloaded, the smartcard would be personalized at the point of usage immediately when the objects are received.

The developer or administrator of smartcard applications can test smartcard personalization profiles prior to effectively modifying the smartcard structure, avoiding smartcard waste. For example, on the basis of the present invention smartcard application developers could be given a complete development environment allowing them to personalize smartcards without modifying applications accessing them, to visualize graphically the personalization profiles, their compatibility and the current card structure, to change the definitions of the personalization profiles and visualize immediately the compatibility of the personalization profiles being created, to check the compatibility of different personalization profiles as well as the compatibility of a given application's personalization profile with the smartcard structure required for previous versions of the same application, to check if personalization profiles can be merged so that all objects defined in all personalization profiles can share the same security objects such as passwords or cryptographic keys, or to debug and trace the smartcard personalization process.

In accordance with an embodiment, each element of the first and second sets of paths comprises file attributes, and one of the paths of the first set of paths is also an element of the second set of paths. For the one of the paths it is determined if its file attributes are identical in the first and second file trees or less restrictive in the first than in the second file tree. A signal indicative of the compatibility is returned if the file attributes are identical in the first and second file trees or less restrictive in the first than in the second file tree. Personalization profiles found to be compatible in this way can be applied to the same smartcard if the first personalization profile is applied to the smartcard before the second personalization profile.

The embodiment is particularly advantageous as it enables sharing between different applications of a file stored on the smartcard. For example, different applications can share a password file, accessing the same passwords stored in the file, or a cryptographic-key file, accessing the same cryptographic keys in the file, or a data file of arbitrary format.

In accordance with an embodiment, the file attributes, which are considered when determining the compatibility of the first and second personalization profiles, comprise a file existence flag indicating whether the one of the paths must exist prior to applying the respective first or second personalization profile, a file size, a file type, and file access conditions. For the file existence flag of the one of the paths it is determined if it is either identical in the first and second file trees, or the file existence flag of the one of the paths in the second file tree indicates that the one of the paths must exist prior to applying the second personalization profile, while in the first file tree the file existence flag indicates that the same path may be created during the applying of the first personalization profile. For the file size of the one of the paths, it is determined if it is identical in the first and second file trees or greater in the first than in the second file tree. For the file type of the one of the paths, it is determined if it is identical in the first and second file trees. For the file access conditions of the one of the paths, it is determined if they are identical in the first and second file trees.

In accordance with an embodiment, the file type of the one of the paths is a password file in both the first and second file trees. The password file comprises a list of passwords, each password comprising password attributes. Typically passwords, including numerical passwords known as personal identification numbers, are stored on smartcards in files of this type. The determining for the one of the paths if its file attributes are identical in the first and second file trees or less restrictive in the first than in the second file tree further comprises determining if the number of passwords of the password file is identical in the first and second file trees, and determining for each of the passwords if its password attributes are identical in the first and second file trees or less restrictive in the first than in the second file tree.

In accordance with an embodiment, the password attributes, which are considered when determining the compatibility of the first and second personalization profiles, comprise a password value, a maximum number of retries before the password is blocked, a further password value for unblocking the password once it has been blocked or an indication that no such further password value for unblocking exists, and a mode of presentation of the password. The password value can be a literal value, or the specification that a value has to be provided at the time of applying the respective personalization profile. For the password value, it is determined if it is identical in the first and second file trees. For the maximum number of retries, it is determined if it is equal in the first and second file trees, or greater in the first than in the second file tree. For the further password value for unblocking, it is determined if either no password value for unblocking exists in the second file tree, or the further password value for unblocking is identical in the first and second file trees.

In accordance with an embodiment, the file type of the one of the paths is a cryptographic-key file in both the first and second file trees. The cryptographic key file comprises a list of cryptographic keys, each cryptographic key comprising a key length. The determining for the one of the paths if its file attributes are identical in the first and second file trees or less restrictive in the first than in the second file tree, further comprises determining if the number of cryptographic keys is identical in the first and second file trees, and determining for each of the cryptographic keys if its key length is equal in the first and second file trees or shorter in the first than in the second file tree. Preferably, each cryptographic key further comprises either a literal key value, or the specification that a key value has to be provided at the time of applying the respective personalization profile. The determining for the one of the paths if its file attributes are identical in the first and second file trees or less restrictive in the first than in the second file tree, then preferably further comprises determining for each of the cryptographic keys if its key length is equal in the first and second file trees or the key value in the first file tree has to be provided at the time of applying the first personalization profile, or the key value in the second file tree is given as a literal key value.

The method can be extended to encompass further kinds of smartcard objects, or even generalized to determining the compatibility of objects which are not stored on a smartcard. For example, it can be used to determine the compatibility of access control policies for different applications in a corporate information technology environment. As an illustration, a first access control policy for a first application shall be assumed to require authentication of a user through a password with a minimum length of 8 characters, a maximum of 3 retries before blocking with unblocking permitted, an expiry period of 10 weeks, and an expiry date of Dec. 31, 2005 or earlier. A second application shall be assumed to impose a second access control policy that is identical to the first with the exception that the minimum length of the password shall be 4 characters. The method can then be used to determine that the second access control policy is less restrictive than the first, and grant a user already authenticated for the first application access for the second one without further authentication. On the contrary, a user authenticated for the second application needs to re-authenticate with a different password for the first application.

In accordance with an embodiment, the intersection of the first and second sets of paths comprises more than one common element. The method further comprises repeating with respect to each of the common elements the determining for the one of the paths if its file attributes are identical in the first and second file trees or less restrictive in the first than in the second file tree. The returning a signal indicative of compatibility if the file attributes for the one of the paths are identical in the first and second file trees or less restrictive in the first than in the second file tree is adapted to return the signal if the file attributes for each of the common elements are identical in the first and second file trees or less restrictive in the first than in the second file tree.

In accordance with an embodiment, a state machine is provided. During each cycle of a loop iterating over the set of common elements, the state machine is advanced according to the result of the determining for the one of the paths if its file attributes are identical in the first and second file trees or less restrictive in the first than in the second file tree. The state that the state machine is found in after repeating with respect to each of the common elements determines whether the signal indicative of the compatibility of the first and second personalization profiles is returned. Preferably, the repeating is terminated as soon as the state machine has reached a state signifying incompatibility, otherwise after reaching the end of the set of common elements.

Preferably, during each cycle of the loop it is determined for the respective one of the paths not only whether its file attributes are identical in the first and second file trees or less restrictive in the first than in the second file tree, but also whether the same holds with the first and second file trees reversed, in other words, whether the file attributes of the one of the paths are identical in the second and first file trees or less restrictive in the second than in the first file tree. If both hold true the file attributes of the one of the paths are defined as equivalent in the first and second file trees. If only the former holds true the file attributes of the one of the paths are defined as less restrictive in the first than in the second file tree. If only the latter holds true the file attributes of the one of the paths are defined as more restrictive in the first than in the second file tree. If neither the former nor the latter hold true the file attributes are defined as incompatible in the first and second file trees.

Unless for one of the common elements the file attributes are incompatible in the first and second file trees or more restrictive in the first than in the second file tree, the first and second personalization profiles are determined to be compatible in the order of the first personalization profile being applied to the smartcard before the second personalization profile. Unless for one of the common elements the file attributes are incompatible in the first and second file trees or less restrictive in the first than in the second file tree, the first and second personalization profiles are determined to be compatible in the order of the first personalization profile being applied to the smartcard after the second personalization profile.

In accordance with an embodiment, the first personalization profile is already applied to the smartcard, and information on the current state of the smartcard is retrieved from the smartcard. The embodiment relies on having access to a record of the second personalization profile, comprising a description of all objects and relevant object attributes that the second application requires being present on the smartcard, preferably in the form of a file of Extended Markup Language format. Access to a corresponding record of the first personalization profile is unnecessary because the information retrieved from the smartcard substitutes for the information comprised by the first personalization profile. In effect, the embodiment serves to determine the compatibility of a given personalization profile, here called the second personalization profile, with the current state of the smartcard. In other words, by determining whether the first and second personalization profiles are compatible in the order of the first personalization profile being applied to the smartcard before the second profile, it is determined whether it the second personalization profile can be applied to the smartcard in its current state.

No assumption for the history of the current state of the smartcard is made—the smartcard could be empty, i.e. not containing any objects for use by a specific application, or have previously been personalized for one or more unspecified applications. There is no need to access any records of personalization profiles that may have been applied earlier. Independent of being personalized for a specific application, the smartcard could also contain objects created by default by the manufacturer of the smartcard.

Preferably, to retrieve the information on the current state of the smartcard from the smartcard, for each path being an element of the second set of paths an attempt is made to select the path on the smartcard. If the attempt is successful, it is known that the path is an element of both the first and second sets of paths, where the first set of paths is understood to mean the set of all paths currently existing on the smartcard. For each smartcard object listed in the record of the second personalization profile, the system will try to select it on the smartcard and in the case the select is successful, it will verify that that object attributes are compatible with those on the smartcard.

In accordance with an embodiment, a set of personalization profiles of the smartcard for a set of respective applications is provided. The method is adapted to comprise repeating the method as defined for every ordered subset of two elements from the set of personalization profiles, determining for each ordered subset whether the elements of the ordered subset are compatible to be applied to the smartcard, given that the second element is applied after the first. An attempt is made to find a permutation on the set of personalization profiles so that every element of the permutation is compatible with all personalization profiles preceding it. If such a permutation is found, a signal indicative of the compatibility of the set of personalization profiles is returned. Here compatibility means that there exists at least one permutation defining an order, in which the set of personalization profiles can be applied to the smartcard.

The method can be put into use for configuring new personal digital assistants, notebooks and other computer systems with a set of pre-selected personalization profiles, the compatibility of which has been determined. The user may choose to install one or more of the applications associated with these personalization profiles on the computer system. He or she can then personalize a single smartcard for the applications because the pre-selected personalization profiles for the applications are compatible without the user needing to modify them. A configuration in this way is least difficult to achieve if applications do not share any objects and if personalization profiles refer to logical names instead of absolute paths on the card.

In accordance with an embodiment, the personalization profiles determined to be compatible are applied to the smartcard in the order they were found compatible. Because the compatibility has been verified beforehand, the applying of the personalization profiles in the order they were found compatible is guaranteed to succeed, except for exceptional events such as card removal, cable disconnection, card reader failure or card reader driver failure. Preferably, an equally possible failure because of insufficient memory available on the smartcard is ruled out by verifying before applying the personalization profiles that the necessary memory is available on the smartcard. Preferably, the system furthermore verifies before applying the personalization profiles that all necessary data such as passwords needed to access or create objects on the smartcard are available.

Preferably, the computer system provides an application programming interface comprising a function canpersonalize( . . . ) that verifies whether a given set of personalization profiles can be applied to the smartcard. The function canpersonalize( . . . ) takes as parameters a list of records of personalization profiles, and a list of personalization parameters with associated values such as passwords needed to access or create objects on the smartcard that have to be supplied at the time of applying the personalization profiles. The function determines whether an order exists, in which the personalization profiles supplied as named in the list of records of personalization profiles can be applied to the smartcard, and returns a true value if the personalization profiles can be applied.

Preferably, the application programming interface comprises a further function applypersonalizations( . . . ) that requires the same parameters as the function can Personalize( . . . ) and performs the same verification. If an order exists in which the personalization profiles supplied as named in the list of records of personalization profiles can be applied to the smartcard, the function applypersonalizations( . . . ) applies to the smartcard the personalization profiles in the order found compatible, using the values of the personalization parameters as supplied in the list of personalization parameters with associated values.

BRIEF DESCRIPTION OF THE DRAWINGS

In the following preferred embodiments of the invention will be described in greater detail by way of example only making reference to the drawings in which.

DETAILED DESCRIPTION

Figure 1:
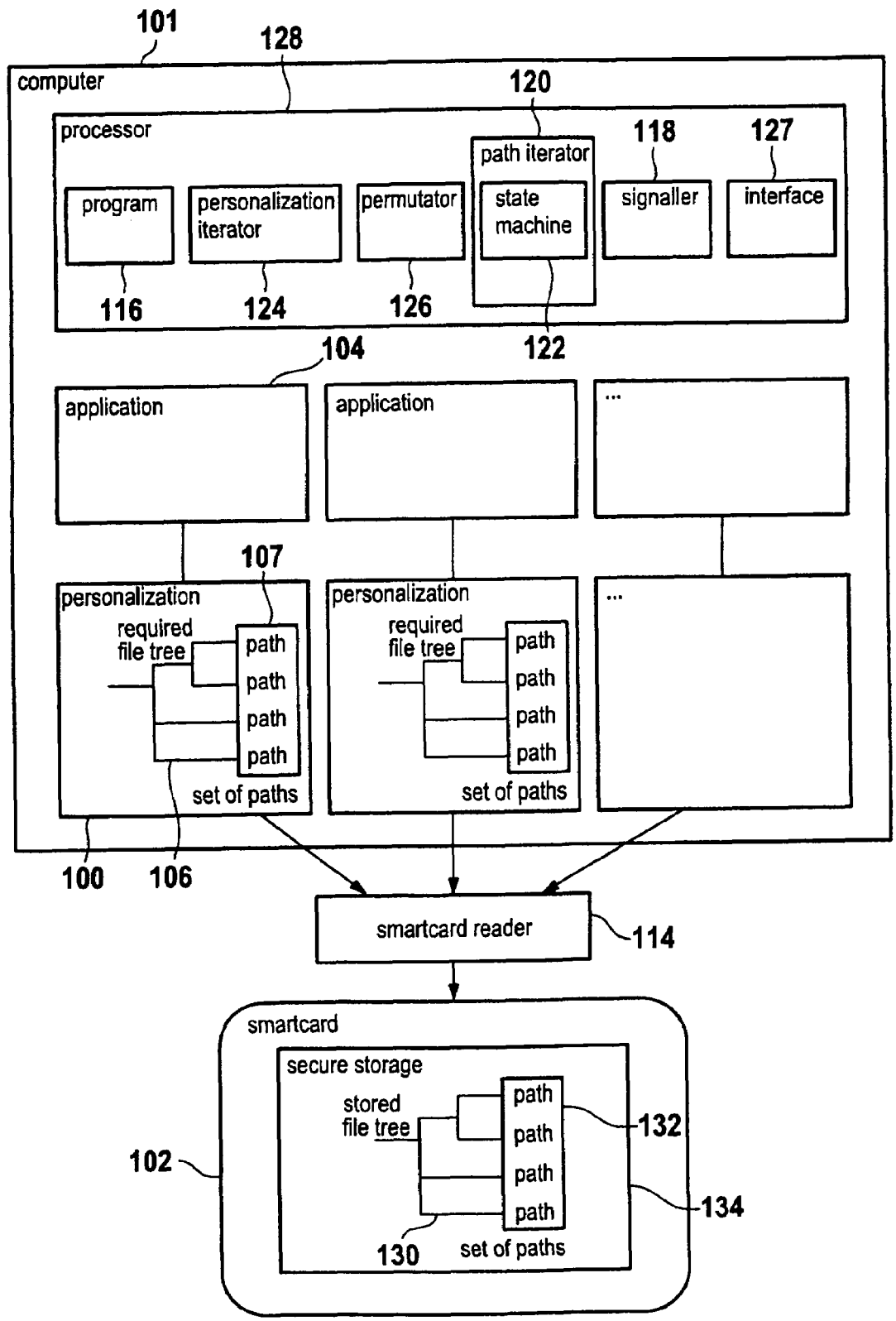
FIG. 1 is a block diagram of a first embodiment of a computer system of the invention.

FIG. 1 shows a computer system comprising a computer 101 connected to a smartcard 102 via a smartcard reader 114.

The smartcard comprises secure storage 134 accessible from the computer where files can be stored in the stored file tree 130. The location of each file stored is uniquely described by a path, the set of paths 132 characterizing the stored file tree. The computer comprises a first and second application 104, each requiring the smartcard to be personalized according to a respective first and second personalization profile 100. The first and second personalization profiles define respective first and second required file trees 106 having respective first and second sets of paths 107. Each of the paths defines the location at which the respective application expects the file to be present in the stored file tree 130 on the smartcard 102. The personalization profiles themselves may be each recorded in a file, preferably of Extensible Markup Language format, persistently stored on the computer 101, or downloaded from a central store such as a database or web server to the computer 101 just before personalization, or stored on the smartcard itself.

In operation, the processor 128 executes program instructions 116 for determining if the first and second sets of paths 107 are disjoint, i.e. have no elements in common. From the sets being disjoint follows that the first and second applications can share the smartcard without interfering with each other because they do not require a file to be stored in a common location on the smartcard. If the sets have been determined to be disjoint the processor furthermore executes a signaller function 118, which returns a signal indicative of the compatibility of the first and second personalization profiles, meaning that both personalization profiles can be applied to the smartcard in any order.

Preferably, if the first personalization profile has already been applied to the smartcard 102, the processor 128 obtains information on the second file tree, required by the second application, from a file, e.g. of Extensible Markup Language format, wherein the second personalization profile is recorded. For obtaining corresponding information on the first file tree, the processor does not need to make use of a corresponding file that may or may not be available, in which the first personalization profile is recorded. Instead, the processor retrieves information on the first file tree from the smartcard 102 by examining the stored file tree 130.

To obtain the information on the first file tree, the processor executes program instructions 116 for determining the intersection of the set of paths 132 of the stored file tree 130 as it exists on the smartcard 102 with the set of paths 107 of the second file tree 106 as required by the second application and described in the file, in which the second personalization profile is recorded. Using a path iterator 120 the processor iterates over the second set of paths, attempting for each element of the second set of paths to select the path on the smartcard. If the attempt is successful, the processor has confirmed that the path exists in the stored file tree 130 on the smartcard. If none of the attempts is successful, the processor has determined that the first and second sets of paths are disjoint, meaning that the second personalization profile can be applied to the smartcard in its current state.

The processor 128 preferably comprises further program instructions 116 for handling the case that one of the paths of the first set of paths is also an element of the second set of paths. Executing the program instructions the processor determines for the one of the paths if its file attributes are identical in the first and second file trees or less restrictive in the first than in the second file tree. If this is determined to be true the signaller 118 returns a signal indicative of the compatibility meaning that the first and second personalization profiles can be applied to the smartcard if the first personalization profile precedes the second personalization profile.

The processor 128 preferably comprises a path iterator 120 that is used for handling the case that more than one of the paths of the first set of paths is also an element of the second set of paths, i.e. the first and second sets of paths have more than one common element. The path iterator 120 repeats with respect to each of the paths common to the first and second sets of paths the determining for the one of the paths if its file attributes are identical in the first and second file trees or less restrictive in the first than in the second file tree. The signaller 118 for returning a signal indicative of the compatibility is adapted to return the signal if the file attributes for each of the common elements are identical in the first and second file trees or less restrictive in the first than in the second file tree. Preferably the path iterator 120 advances a state machine 122 according to the result of the determining for each of the common elements if its file attributes are identical in the first and second file trees or less restrictive in the first than in the second file tree. The final state of the state machine then determines the compatibility of the first and second personalization profiles and the order in which, if applied to the card, they are compatible.

The processor 128 preferably further comprises a personalization profile iterator 124 and a permutator 126, enabling determining whether a given set of personalization profiles 100 is compatible to be applied together to the smartcard 102. In operation, for every ordered subset of two elements from the set of personalization profiles the personalization profile iterator 124 repeats determining the compatibility of applying to the smartcard the two personalization profiles being the elements of the subset. Using the resulting information on the compatibility of every ordered subset of two elements, the permutator 126 attempts to construct a permutation on the entire set of personalization profiles, in which every personalization profile being an element of the permutation is compatible to be applied to the smartcard after any of the personalization profiles that precede it as elements in the permutation. If the permutator 126 can construct the permutation, the signaller 118 returns a signal indicating compatibility in the sense that the set of personalization profiles can be ordered in a way allowing all of its elements to be applied to the smartcard.

Preferably the processor 128 makes available an application programming interface 127 comprising functions that can be called from any applications that a software developer may wish to create. The application programming interface preferably comprises a function canPersonalize( . . . ) and a function applyPersonalizations( . . . ). Both functions expect as parameters a list of records of personalization profiles and a list of additional personalization parameters with associated values. Both functions attempt to find an order in which the personalization profiles specified in the list of records of personalization profiles can be applied to the smartcard, considering also the already applied personalization profile implied by the stored file tree 130 on the smartcard. If an order of applying is found in which the personalization profiles are compatible with each other and the stored file tree on the smartcard, the function canPersonalize( . . . ) returns a true value, whereas the function applyPersonalizations( . . . ) applies the personalization profiles to the smartcard in the order found compatible and then returns a true value.

Figure 2:
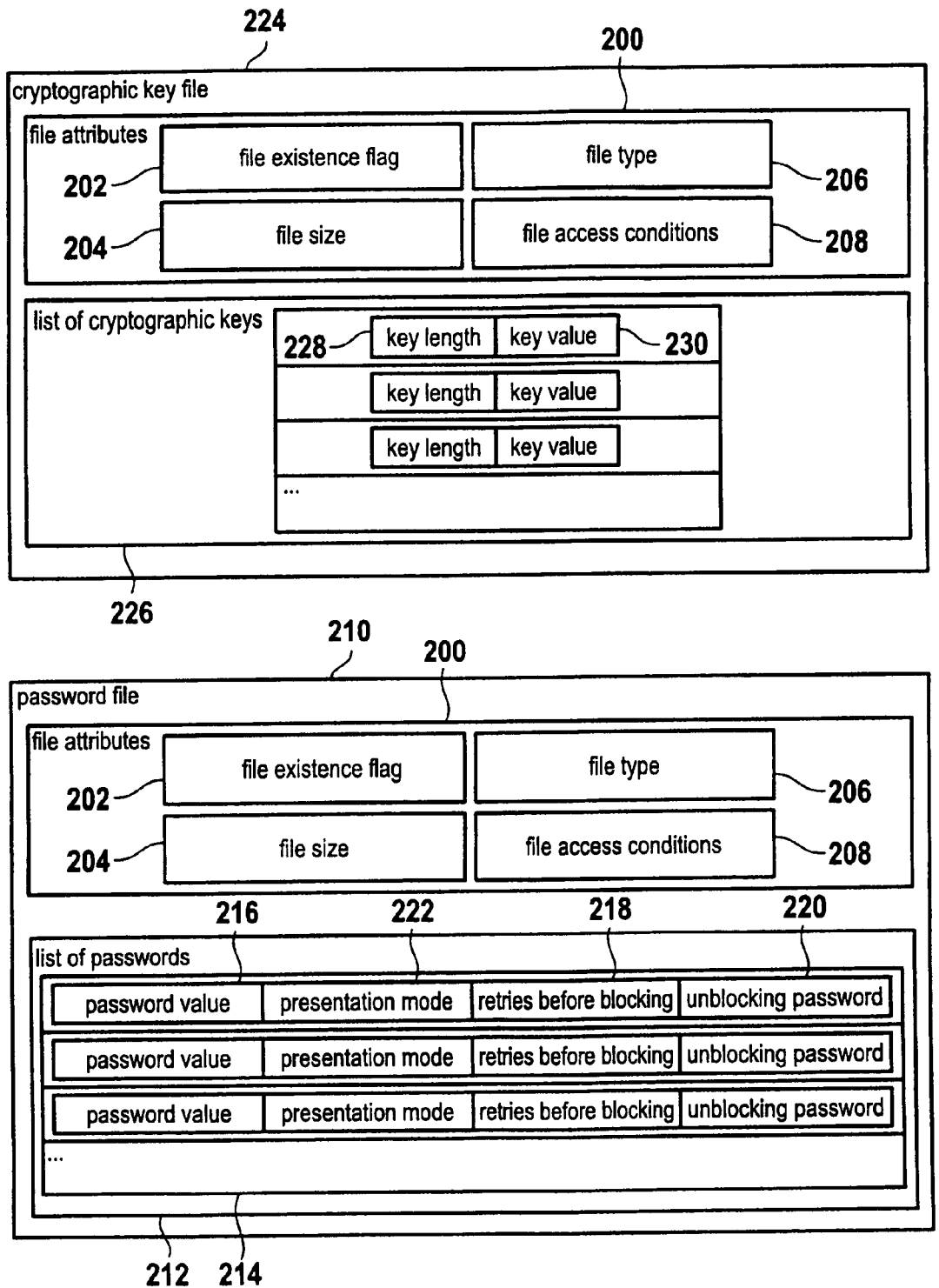
FIG. 2 is a block diagram of file attributes considered when determining the compatibility of smartcard personalization profiles.

FIG. 2 shows two examples of files, a cryptographic key file 224 and a password file 210, that a personalization profile may require to be stored on the smartcard. When determining the compatibility of the first and second personalization profiles, for each of the elements common to both the first and second sets of paths file attributes are examined. For each of the file attributes it is determined if the file attributes are identical in the first and second file trees or less restrictive in the first than in the second file tree.

For both examples shown 224, 210 and preferably for any type of file that the first and second personalization profiles may require to be stored on the smartcard, the file attributes 200 examined comprise a file existence flag 202, which indicates whether the file must exist prior to applying the respective first or second personalization profile. When examining the file existence flag in the first and second personalization profiles, the processor determines if either in the first and second file trees the file existence flag is identical, or in the second file tree the file existence flag indicates that the file must exist prior to applying the second personalization profile while in the first file tree the file existence flag indicates that the file can be created during the applying of the first personalization profile. In the case of the first personalization profile being already applied to the smartcard this condition is implicitly fulfilled. The file attributes 200 further comprise the file size 204, the processor determining if the file size of the file is identical in the first and second file trees or greater in the first than in the second file tree. The file attributes 200 further comprise a file type 206, the processor determining if the file type is identical in the first and second file trees. The file attributes 200 further comprise file access conditions 208 the processor determining if the file access conditions are identical in the first and second file trees.

If the file type 206 in both first and second file trees is a password file 210 comprising a list of passwords 212 or in both first and second file trees is a cryptographic-key file 224 comprising a list of cryptographic keys 226, preferably further attributes are considered. For a password file 210 comprising a list of passwords 212 the processor determines if the number of passwords of the password file is identical in the first and second file trees. The processor further considers password attributes 214, determining for each of the passwords if its password attributes are identical in the first and second file trees or less restrictive in the first than in the second file tree.

Preferably the password attributes 214 considered comprise a password value 216, the processor determining if the password value is identical in the first and second file trees. The password attributes further comprise the maximum number of retries 218 before blocking the password, the processor determining if the maximum number of retries before blocking is equal in the first and second file trees or greater in the first than in the second file tree. The password attributes further comprise a further password value 220 for unblocking or an indication that no further password value for unblocking exists, the processor determining if no further password value for unblocking exists in the second file tree or the further password value for unblocking is identical in the first and second file trees. Password attributes further comprise a mode of password presentation 222, the processor determining if the mode of password presentation is identical in the first and second file trees.

For a cryptographic-key file comprising a list of cryptographic keys 226 the processor further determines if the number of the cryptographic keys is identical in the first and second file trees, and if for each of the cryptographic keys its key length is equal in the first and second file trees or shorter in the first than in the second file tree. Preferably the processor further determines if for each of the cryptographic keys if the key length is equal in the first and second file trees, or the key value 230 in the first file tree has to be provided at the time of applying the first personalization profile, or the key value in the second file tree is given as a literal key value.

Figure 3:
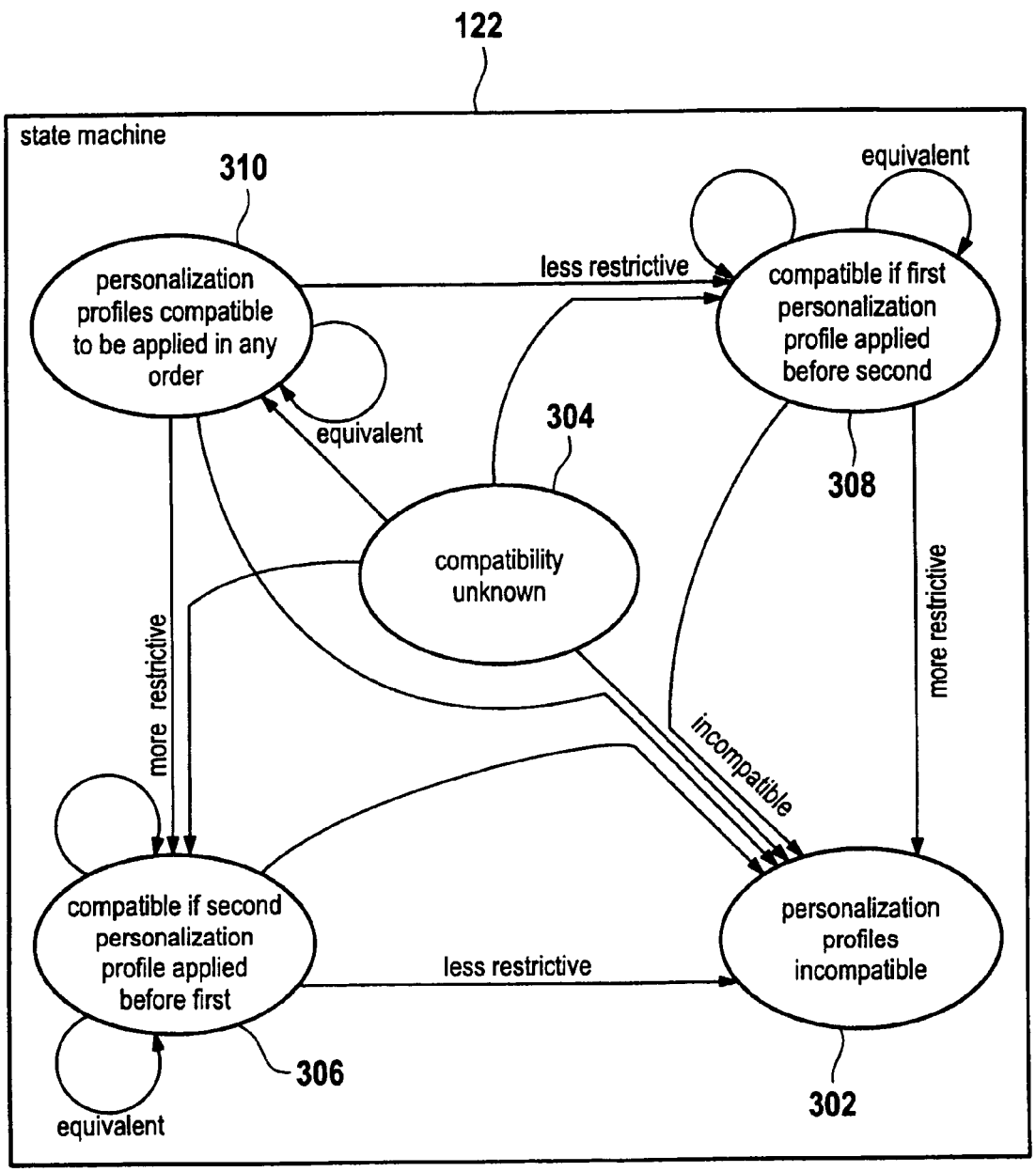
FIG. 3 is a state diagram of a state machine used in determining the compatibility of smartcard personalization profiles.

FIG. 3 shows a preferred state diagram of the state machine 122. The path iterator 120 iterates over the common elements of the first and second sets of paths, the state machine being before the first iteration in a start state 304, in which the compatibility of the first and second personalization profiles is unknown. The processor determines for each of the common elements whether its file attributes are identical in the first and second file trees or less restrictive in the first than in the second file tree, and also conversely whether the file attributes of the one of the paths are identical in the second and first file trees or less restrictive in the second than in the first file tree. If both hold true the state machine is advanced according to the arrows marked "equivalent". If only the former holds true the state machine is advanced according to the arrows marked "less restrictive". If only the latter holds true the state machine is advanced according to the arrows marked "more restrictive". If neither the former nor the latter hold true the state machine is advanced according to the arrows marked "incompatible".

Preferably, in the case of the smartcard being partially damaged or any other exceptional event implying that the compatibility verification cannot proceed, the system advances back to the start state 304 to signify that the compatibility of the first and second personalization profiles is unknown, and the state machine aborts its execution.

Preferably, the iteration is aborted as soon as the state 302 signifying incompatibility of the personalization profiles is reached. At the end of the iterating over the common elements the state machine is either in a state 302 signifying incompatibility of the first and second personalization profiles, in a state 308 signifying compatibility provided that the first personalization profile is applied to the smartcard before the second personalization profile, or in a state 306 signifying compatibility provided that the first personalization profile is applied to the smartcard after the second personalization profile, or in a state 310 signifying compatibility of the first and second personalization profiles to be applied to the smartcard in any order, or in the start state 304 signifying that an exceptional event has occurred, due to which the compatibility of the first and second personalization profiles could not be established.

LIST OF REFERENCE NUMERALS

100 Personalization profile
101 Computer
102 Smartcard
104 Application
106 Required file tree
107 Required set of paths
114 Smartcard reader
116 Program instructions
118 Signaller
120 Path iterator
122 State machine
124 Personalization profile iterator
126 Permutator
127 Interface available to applications to verify and apply personalization profiles
128 Processor
130 Stored file tree
132 Stored set of paths
134 Secure storage
200 File attributes
202 File existence flag
204 File size
206 File type
208 File access conditions
210 Password file
212 List of passwords
214 Password attributes
216 Password value
218 Maximum number of retries before blocking
220 Password value for unblocking
222 Mode of password presentation
224 Cryptographic-key file
226 Cryptographic keys
228 Key length
230 Key value
300 State machine
302 State signifying incompatibility
304 Start state, signifying unknown compatibility
306 State signifying compatibility conditional to the first personalization profile being applied after the second personalization profile
308 State signifying compatibility conditional to the first personalization profile being applied before the second personalization profile
310 State signifying compatibility independent of the order the in which the personalization profiles are applied

The invention claimed is:

1. A method of determining the compatibility, for application to a smartcard, of first and second personalization profiles for respective first and second applications, the first and second applications requiring respective first and second file trees on the smartcard for execution of the first and second applications by a computer that is coupled to the smartcard, the first and second file trees having respective first and second sets of paths, the method comprising:
  determining if the first and second sets are disjoint;
  if the first and second sets are disjoint, returning a signal indicative of the compatibility;
  if the first and second sets are not disjoint and if each path of the first and second sets of paths comprises file attributes, and one path of the first set of paths is also a path of the second set of paths, determining if file attributes of said one path are identical in the first file tree and the second file trees or less restrictive in the first file tree than in the second file tree; and returning a signal indicative of the compatibility if the file attributes of said one path are identical in the first file tree and the second file tree or less restrictive in the first file tree than in the second file tree.

2. The method of claim 1, the file attributes comprising a file existence flag indicating whether the one of the paths must exist prior to the respective applying of the first or second personalization profile, a file size, a file type, and file access conditions, the determining for the one of the paths if its file attributes are identical in the first and second file trees or less restrictive in the first than in the second file tree comprising:
  determining if the file existence flag of the one of the paths is identical in the first and second file trees, or the file existence flag of the one of the paths in the second file tree indicates that the one of the paths must exist prior to the applying of the second personalization profile,
  determining if the file size of the one of the paths is identical in the first and second file trees or greater in the first than in the second file tree,
  determining if the file type of the one of the paths is identical in the first and second file trees, and
  determining if the file access conditions of the one of the paths are identical in the first and second file trees.

3. The method of claim 2, the file type of the one of the paths being a password file comprising a list of passwords, each password comprising password attributes, the determining for the one of the paths if its file attributes are identical in the first and second file trees or less restrictive in the first than in the second file tree further comprising:

determining if the number of the passwords of the password file is identical in the first and second file trees, and determining for each of the passwords if its password attributes are identical in the first and second file trees or less restrictive in the first than in the second file tree.

4. The method of claim 3, the password attributes comprising a password value, a maximum number of retries before blocking, a further password value for unblocking or an indication that no further password value for unblocking exists, and a mode of password presentation, the determining for each of the passwords if its password attributes are identical in the first and second file trees or less restrictive in the first than in the second file tree comprising:

determining if the password value is identical in the first and second file trees, determining if the maximum number of retries before blocking is equal in the first and second file trees or greater in the first than in the second file tree, determining if no further password value for unblocking exists in the second file tree or the further password value for unblocking is identical in the first and second file trees, and determining if the mode of password presentation is identical in the first and second file trees.

5. The method of claim 4, the file type of the one of the paths being a cryptographic key file comprising a list of cryptographic keys, each cryptographic key comprising a key length, the determining for the one of the paths if its file attributes are identical in the first and second file trees or less restrictive in the first than in the second file tree further comprising:

determining if the number of the cryptographic keys is identical in the first and second file trees, and determining for each of the cryptographic keys if the key length is equal in the first and second file trees or shorter in the first file tree than in the second file tree.

6. The method of claim 1, the intersection of the first and second sets of paths comprising more than one common elements, the method further comprising repeating with respect to each of the common elements the determining for the one of the paths if its file attributes are identical in the first and second file trees or less restrictive in the first than in the second file tree, the returning a signal indicative of the compatibility adapted to return the signal if the file attributes for each of the common elements are identical in the first and second file trees or less restrictive in the first than in the second file tree.

7. The method of claim 6, the repeating further comprising advancing a state machine according to the respective result of the determining for the one of the paths if its file attributes are identical in the first and second file trees or less restrictive in the first than in the second file tree.

8. A computer program product comprising computer executable instructions for performing the method of claim 1.

9. A method of determining the compatibility, for application to a smartcard, of first and second personalization profiles for respective first and second applications, the first and second applications requiring respective first and second file trees on the smartcard for execution of the first and second applications by a computer that is coupled to the smartcard, the first and second file trees having respective first and second sets of paths, the method comprising:

determining if the first and second sets are disjoint; and returning a signal indicative of the compatibility if the first and second sets are disjoint if the first and second sets are disjoint, wherein the first personalization profile is already applied to the smartcard, and information on the first file tree is retrieved from the smartcard.

10. A method of determining the compatibility, for application to a smartcard, of a set of personalization profiles of the smartcard for a set of respective applications, the set of applications requiring respective file trees on the smartcard for execution of the set of applications by a computer that is coupled to the smartcard, the set of file trees having respective sets of paths, the method comprising:

(a) determining if a first set of paths and a second set of paths are disjoint;

(b) returning a signal indicative of the compatibility if the first and second sets are disjoint;

(c) repeating (a) and (b) for every ordered subset of two elements from the set of personalization profiles, attempting to find a permutation on the set of personalization profiles so that every element of the permutation is compatible with all personalization profiles preceding it, returning a signal indicative of the compatibility of the set of personalization profiles if the permutation was found.

11. A computer system comprising:

a computer being adapted to be coupled to a smartcard, first and second personalization profiles that respectively describe personalizing the smartcard for respective first and second applications, the first and second applications requiring respective first and second file trees on the smartcard for execution of the first and second applications by the computer, the first and second file trees having respective first and second sets of paths;

program instructions for determining if the first and second sets are disjoint and, if the first and second sets are not disjoint and if each path of the first and second sets of paths comprises file attributes and one path of the first set of paths is also a path of the second set of paths, determining if the file attributes of said one path are identical in the first file tree and the second file tree or less restrictive in the first file tree than in the second file tree; and a signaller for returning a signal indicative of the compatibility of the first and second personalization profiles if the first and second sets are disjoint or if the file attributes of said one path are identical in the first file tree and the second file tree or less restrictive in the first file tree than in the second file tree.

12. The computer system of claim 11, the file attributes comprising a file existence flag indicating whether the one of the paths must exist prior to applying the respective first or second personalization profile, a file size, a file type, and file access conditions, the program instructions for determining for the one of the paths if its file attributes are identical in the first and second file trees or less restrictive in the first than in the second file tree comprising:

program instructions for determining if the file existence flag of the one of the paths is identical in the first and second file trees, or the file existence flag of the one of the paths in the second file tree indicates that the one of the paths must exist prior to applying the second personalization profile, program instructions for determining if the file size of the one of the paths is identical in the first and second file trees or greater in the first than in the second file tree, program instructions for determining if the file type of the one of the paths is identical in the first and second file trees, and program instructions for determining if the file access conditions of the one of the paths are identical in the first and second file trees.

13. The computer system of claim 12, the file type of the one of the paths being a password file comprising a list of passwords, each password comprising password attributes, the program instructions for determining for the one of the paths if its file attributes are identical in the first and second file trees or less restrictive in the first than in the second file tree further comprising:
   program instructions for determining if the number of the passwords of the password file is identical in the first and second file trees, and
   program instructions for determining for each of the passwords if its password attributes are identical in the first and second file trees or less restrictive in the first than in the second file tree.

14. The computer system of claim 13, the password attributes comprising a password value, a maximum number of retries before blocking, a further password value for unblocking or an indication that no further password value for unblocking exists, and a mode of password presentation, the program instructions for determining for each of the passwords if its password attributes are identical in the first and second file trees or less restrictive in the first than in the second file tree comprising:
   program instructions for determining if the password value is identical in the first and second file trees,
   program instructions for determining if the maximum number of retries before blocking is equal in the first and second file trees or greater in the first than in the second file tree,
   program instructions for determining if no further password value for unblocking exists in the second file tree or the further password value for unblocking is identical in the first and second file trees, and
   program instructions for determining if the mode of password presentation is identical in the first and second file trees.

15. The computer system of claim 13, the file type of the one of the paths being a cryptographic key file comprising a list of cryptographic keys, each cryptographic key comprising a key length, the program instructions for determining for the one of the paths if its file attributes are identical in the first and second file trees or less restrictive in the first than in the second file tree further comprising:
   program instructions for determining if the number of the cryptographic keys is identical in the first and second file trees, and
   program instructions for determining for each of the cryptographic keys if the key length is equal in the first and second file trees or shorter in the first file tree than in the second file tree.

16. The computer system of claim 11, the intersection of the first and second sets of paths comprising more than one common elements, the computer system further comprising a path iterator for repeating with respect to each of the common elements the determining for the one of the paths if its file attributes are identical in the first and second file trees or less restrictive in the first than in the second file tree, the signaller for returning a signal indicative of the compatibility adapted to return the signal if the file attributes for each of the common elements are identical in the first and second file trees or less restrictive in the first than in the second file tree.

17. The computer system of claim 16, the path iterator further comprising a state machine that advances according to the result of the respective determining for the one of the paths if its file attributes are identical in the first and second file trees or less restrictive in the first than in the second file tree.

18. A computer system comprising:
   a computer being adapted to be coupled to a smartcard,
   a set of personalization profiles that respectively describe personalizing the smartcard for a set of respective applications, the set of respective applications requiring a set of respective file trees on the smartcard for execution of the set of respective applications by the computer, the set of respective file trees having respective sets of paths;
   program instructions for determining if a first set of paths and a second set of paths are disjoint;
   a personalization profile iterator for repeating the program instructions for determining if the first and second sets of paths are disjoint for every ordered subset of two elements from the set of personalization profiles,
   a permutator for attempting to find a permutation on the set of personalization profiles so that every element of the permutation is compatible with all personalization profiles preceding it,
   a signaller for returning a signal indicative of the compatibility of the first and second personalization profiles if the first and second sets are disjoint or a signal indicative of the compatibility of the set of personalization profiles if the permutation was found.

* * * * *